May 29, 1928. 1,671,306
J. F. MINCHER
VALVE
Filed May 3, 1924
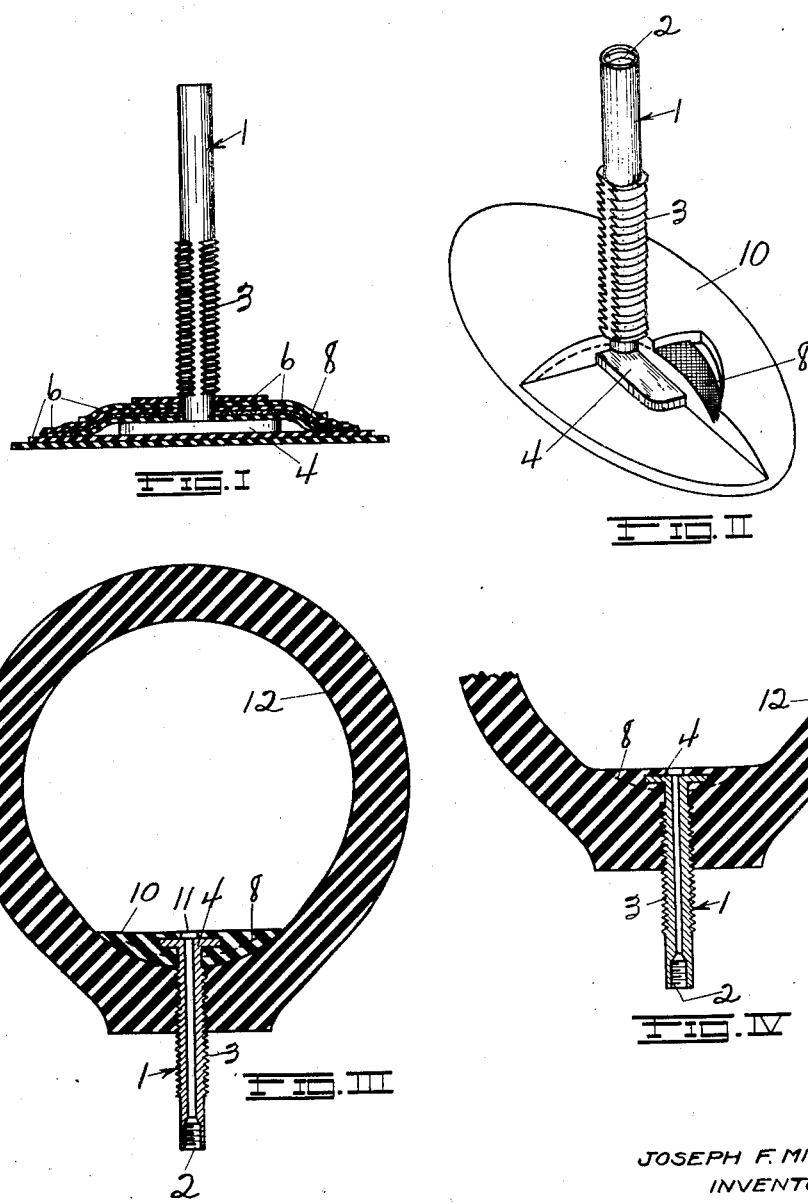
JOSEPH F. MINCHER
INVENTOR
BY (signature)
ATTORNEY Patented May 29, 1928.

1,671,306

UNITED STATES PATENT OFFICE.

JOSEPH F. MINCHER, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

VALVE.

Application filed May 3, 1924. Serial No. 710,781.

My invention relates to the manufacture of pneumatic tubes such as the inner tubes of pneumatic tires and the so-called air bags or cores used in vulcanizing tire casings. More particularly it has in view an improvement in the valves of such articles.

It is an object of my invention to provide as a unitary article a valve stem and pad, and to further provide a unit of that description, of a character that will, when placed in position in the bag, give maximum strength and assurance against leakage.

Other objects will be evident from the following specification and claim.

In the accompanying drawings which illustrate one embodiment of my invention,

Figure 1 is a section showing the manner of laying up the elements of the unit,

Figure 2 is a perspective view with parts cut away showing the completed unit,

Figure 3 is a section showing the unit in position in a raw air bag and

Figure 4 is a fragmentary section showing the bag and unit after curing.

Referring to the drawings 1 designates the valve stem which may be of any approved construction and, as shown, is interiorly threaded at 2 to receive valve parts, if desired, and exteriorly threaded at 3 to receive any conventional air connection. The base of the stem is provided with a metal anchor plate 4. In forming the unit, plies of uncured rubber 6 are cut to the desired size and shape, the upper plies being apertured to receive stem 1 as shown in Figure 1. Between the upper plies of rubber I preferably insert a fabric reinforcement 8. The raw unit is now placed in a suitable mold and semi-cured, the rubber plies uniting as shown in Figure 2, to form the homogeneous base 10 having the plate 4 and fabric 8 completely imbedded therein. An aperture 11 is cut through the portion of the semi-cured body 10 to open the passage through the stem, or provision may be made to open this passage during the molding operation, as by a projecting pin in the mold.

In Figure 3 I show a unit in position in a raw air bag 12. The bag is formed of raw rubber, tubed or otherwise formed to the desired shape and provided with an aperture to receive the stem 1 of the valve unit. The raw bag is then vulcanized under pressure in a conventional manner. The semi-cured base 10 unites with the raw rubber of the bag, so that as shown in Figure 4 the valve and reinforcing ply 8 are imbedded in the base of the bag of which pad 10 now forms an inseparable and homogeneous part.

As will be evident from Figure 4 plate 4 is protected from steam or other gas in the bag and the interior of the bag presents a smooth surface without protruding metal or fabric parts to invite separation and leakage.

I claim:

The method of forming a valve unit which comprises positioning a valve stem provided at its base with an anchor plate upon one or more plies of raw rubber positioning a ply of fabric, aperture to receive said stem, over said anchor plate and rubber plies, positioning one or more plies of rubber over said fabric and semi-curing said fabric and rubber plies in a mold of the desired shape.

In testimony whereof I have signed my name to the above specification.

JOSEPH F. MINCHER.